June 26, 1962 — A. KRANITZ ETAL — 3,041,444
AUTOMATIC ARC WELDERS

Filed April 5, 1961 — 6 Sheets-Sheet 4

INVENTORS.
ARTHUR KRANITZ
JOHN R. KELLNER
BY Morsell & Morsell
ATTORNEYS.

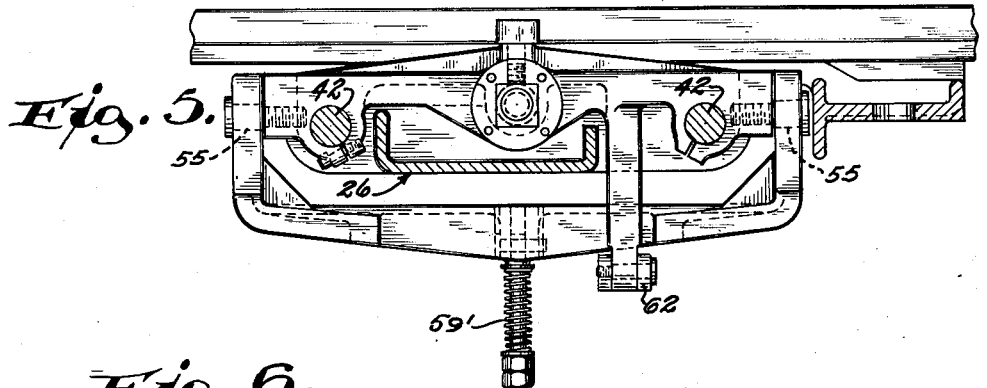
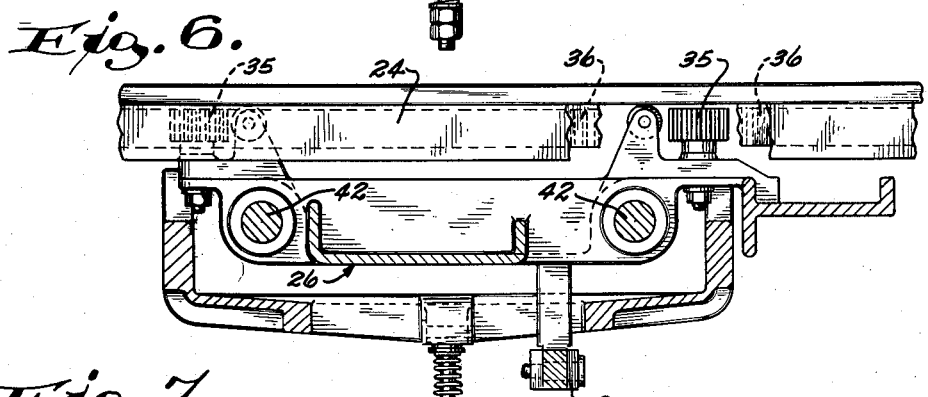
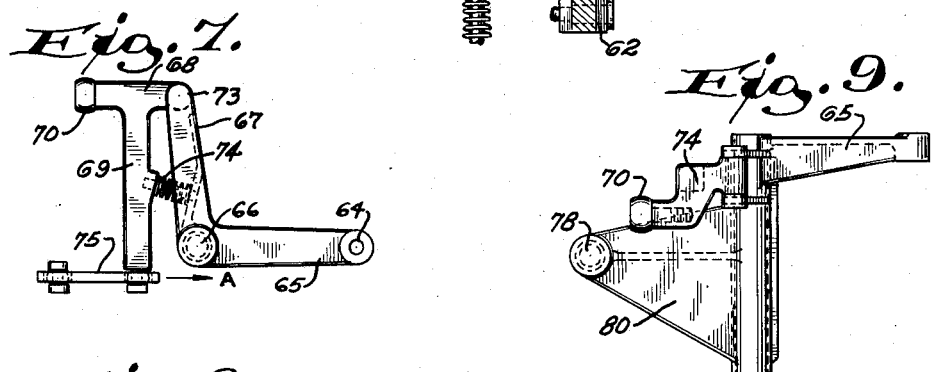
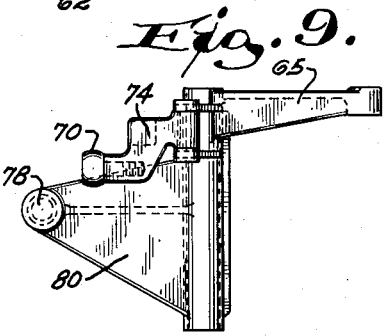
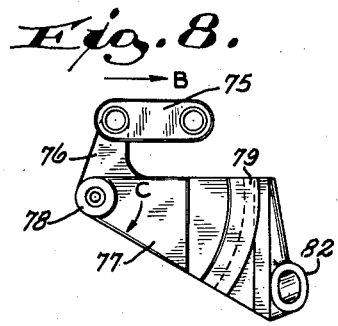
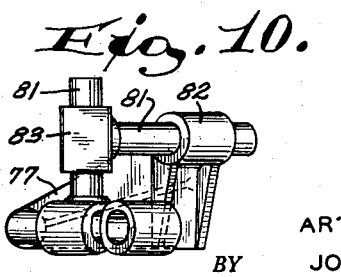
INVENTORS.
ARTHUR KRANITZ
JOHN R. KELLNER
BY Morsell + Morsell
ATTORNEYS.

June 26, 1962  A. KRANITZ ETAL  3,041,444
AUTOMATIC ARC WELDERS
Filed April 5, 1961  6 Sheets-Sheet 6

INVENTORS.
ARTHUR KRANITZ
JOHN R. KELLNER
BY Morsell + Morsell
ATTORNEYS.

Patented June 26, 1962

1

3,041,444
AUTOMATIC ARC WELDERS
Arthur Kranitz, Thiensville, and John R. Kellner, West Bend, Wis., assignors to Banner Welder, Inc., Milwaukee, Wis., a corporation of Wisconsin
Filed Apr. 5, 1961, Ser. No. 100,921
10 Claims. (Cl. 219—125)

This invention relates to improvements in automatic arc welders. Heretofore, automatic arc welding devices have been proposed for automatically performing contour welding, the welding frame being under the control of cam mechanism or the like to cause it to follow a predetermined pattern, which pattern controls the movement of the torch relative to the work so that it will follow the contour of the proposed weld line. On prior devices in order to have the torch maintain constant angles with respect to the work it was necessary to curve the crown of the machine so that the whole carriage followed the contour. In this way there was no problem of maintaining desired angularity of the torch with respect to the work. However, this type of set-up is expensive and the crown portion of the machine has to be specially designed for each job.

It is a general object of the present invention to provide an automatic welding device where it is unnecessary to curve the crown of the machine in order to have the carriage follow the contour of the part, the machine of the present invention being so worked out that it may be readily varied by merely changing the cam members to suit a different piece of work, there being novel means for constantly maintaining selected torch angles throughout the range of movement of the torch while performing its contour welding.

A more specific object of the invention is to provide a device as above described having a supporting frame provided with the cams for controlling the contour of the weld, there being a carriage mounted for horizontal movement on said frame, there being a welding head vertically movably carried by said carriage, and there being a supplemental torch carrying frame pivoted to said vertically movable frame for in and out swinging movement; there also being novel means for moving the torch in two planes relative to its frame to compensate for outward swinging movement of the torch carrying frame and for other changes as the head follows the pattern so that the angle of the torch is always the same with respect to the work regardless of changes in the contour of the weld line on the work.

Other objects of the invention are to provide an automatic arc welder which can be readily adapted to various pieces of work, which is relatively simple in construction, and foolproof in operation.

With the above and other objects in view, the invention consists of the improved automatic arc welder, and all of its parts and combinations, as set forth in the claims, and all equivalents thereof.

In the accompanying drawings, illustrating one complete embodiment of the preferred form of invention in which the same reference numerals designate the same parts in all of the views:

FIG. 5 is a transverse sectional view taken on the line 5—5 of FIG. 2;

FIG. 6 is a transverse sectional view taken on line 6—6 of FIG. 2;

FIG. 7 is a view of one of the cam followers and associated levers employed in the invention;

FIG. 8 is a view of one of the self-adjusting link connections, taken on the line 8—8 of FIG. 3;

FIG. 9 is a view taken on the line 9—9 of FIG. 3;

FIG. 10 is a view looking up at the bottom of the torch; and

Figure 1:
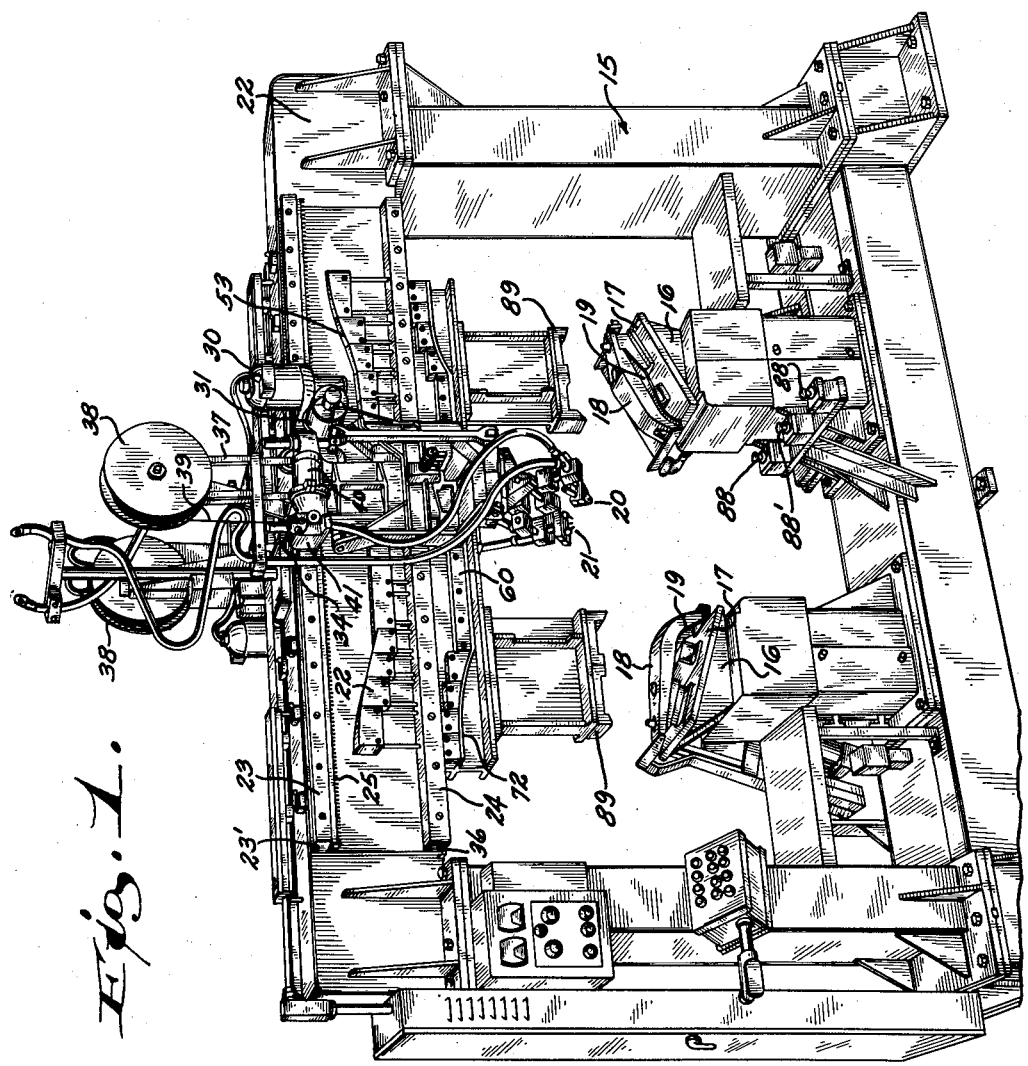
FIG. 1 is a perspective view principally in front elevation of the improved automatic arc welder.

Referring more particularly to the drawings, the device illustrated in FIG. 1 comprises a supporting frame 15 having fluid pressure operated rams 16 suitably supported on the base for elevating movement. On top of the rams are suitable fixtures 17 for supporting the work 18. The work illustrated is an automobile frame part having a contoured weld line 19 on each side along which welding must be performed by the machine. The machine illustrated is a double machine and has one carriage with a welding torch 20 on one side and a similar carriage with a welding torch 21 on the other side, it being understood that the mechanisms on the two sides are in reverse but are otherwise identical. In operation of the machine illustrated, the welds 19 on both sides of the right-hand work piece of FIG. 1 are performed simultaneously and then the welds 19 on both sides of the left-hand work piece.

The supporting frame 15 includes a top horizontal support 22. Inasmuch as both sides of this support are the same except in reverse, the mechanism on one side only will be described. Carried by the vertical face of the horizontal member 22 are upper and lower guiding tracks 23 and 24. The top track 23 has an upwardly facing groove 23' and has a rack bar 25 extending along its underside.

*The Carriage*

Figure 2:
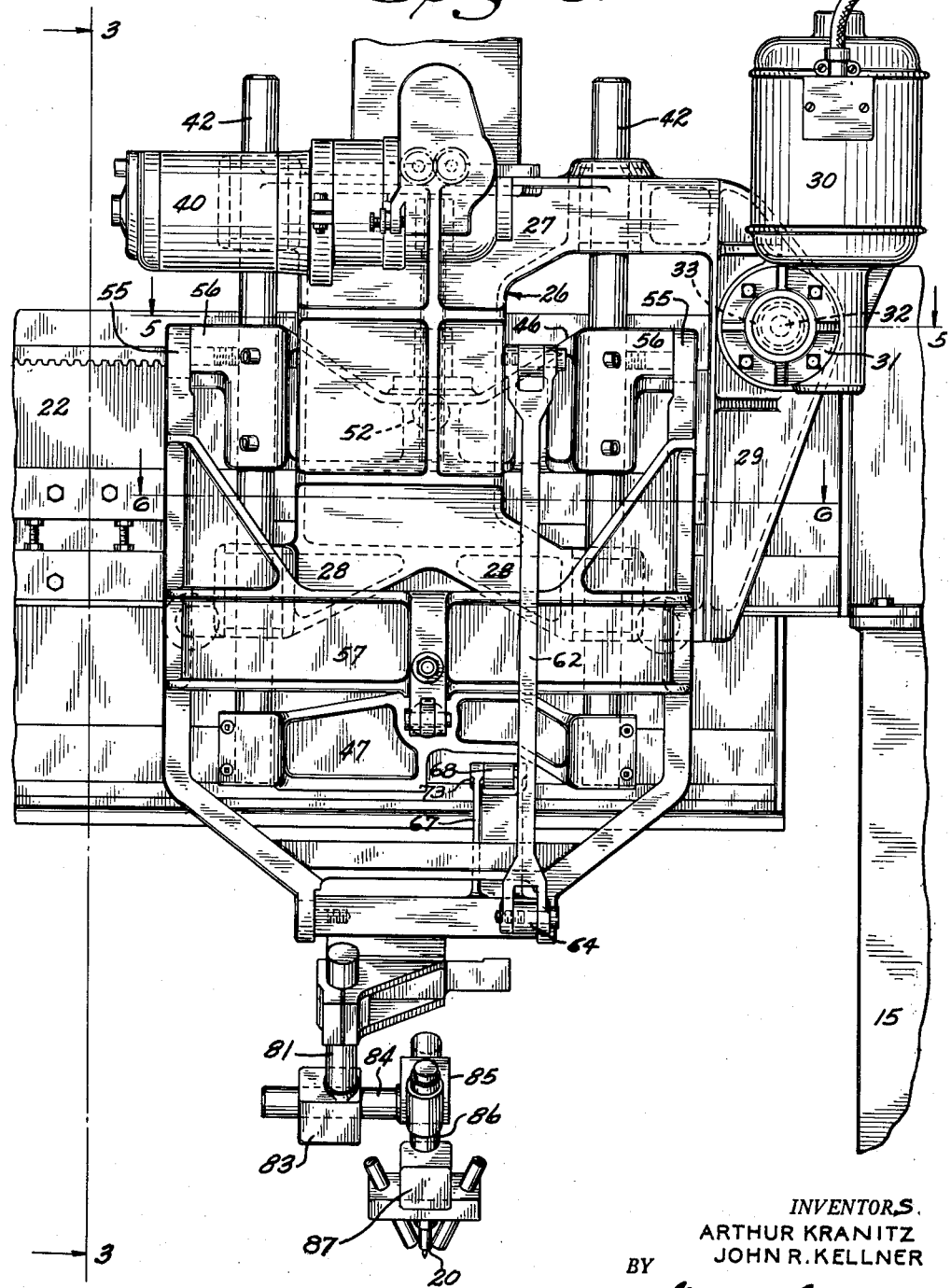
FIG. 2 is a fragmentary front elevational view of the machine showing the movable carriage and associated welding head.
Figure 3:
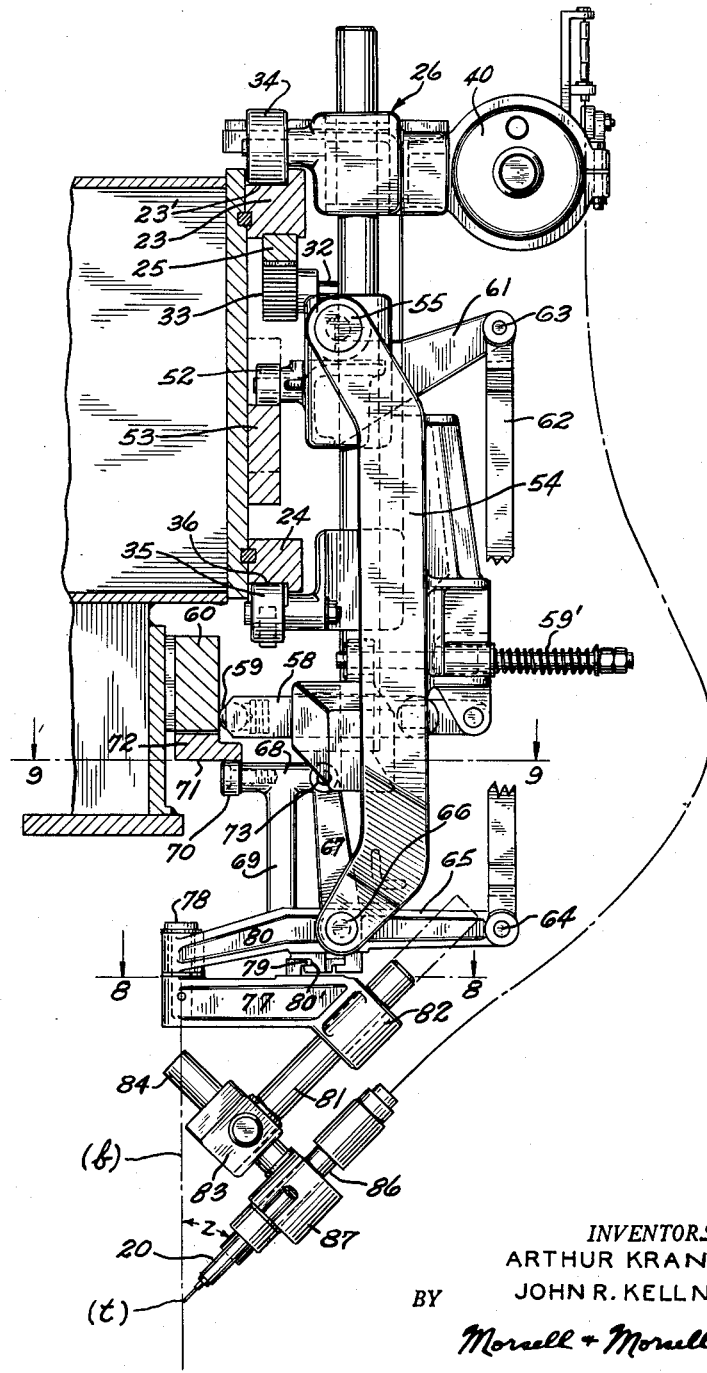
FIG. 3 is a vertical sectional view taken on the line 3—3 of FIG. 2.
Figure 4:
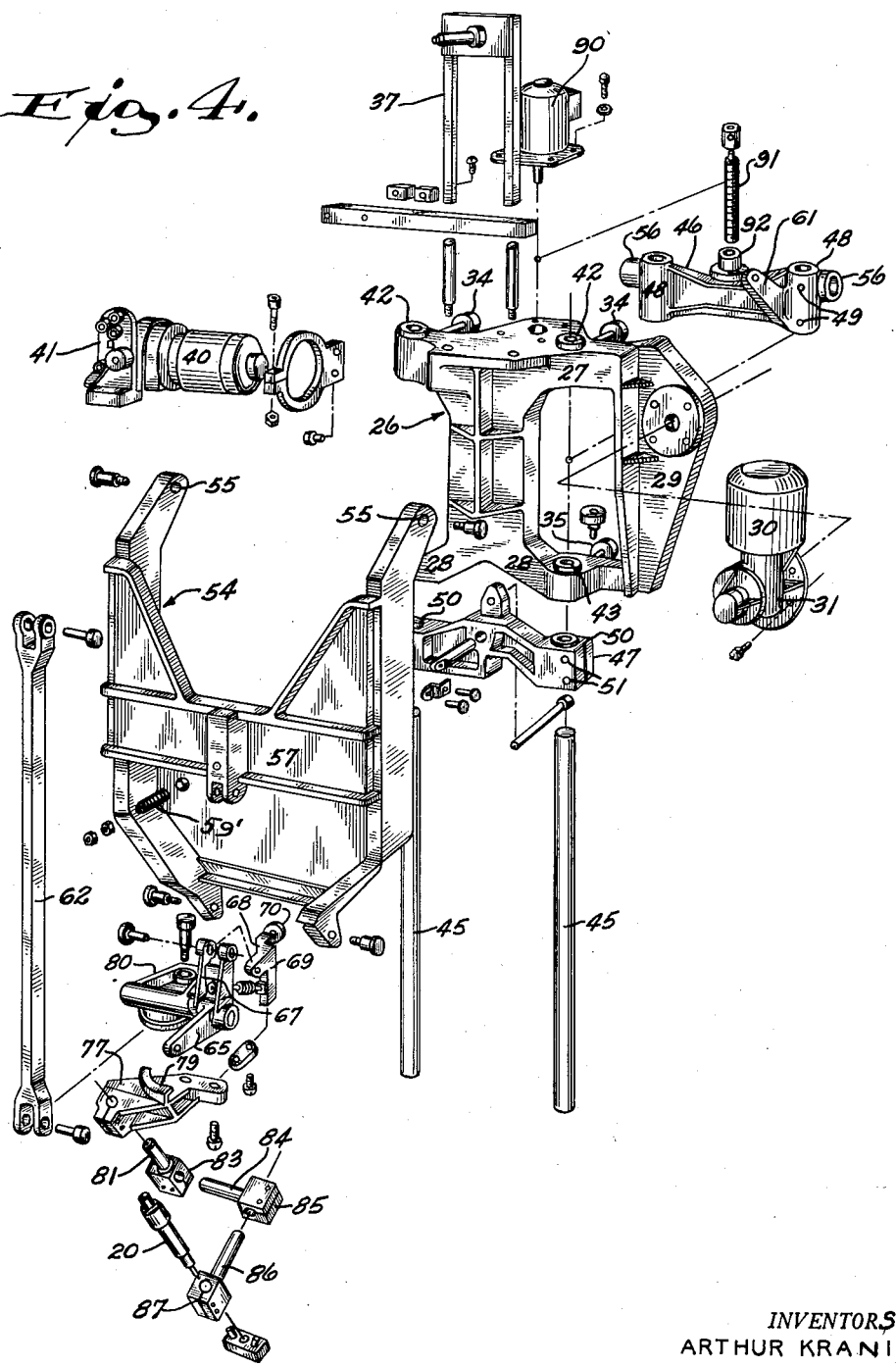
FIG. 4 is an exploded view with the parts in perspective showing the various parts which make up the carriage and associated welding head.
Figure 11:
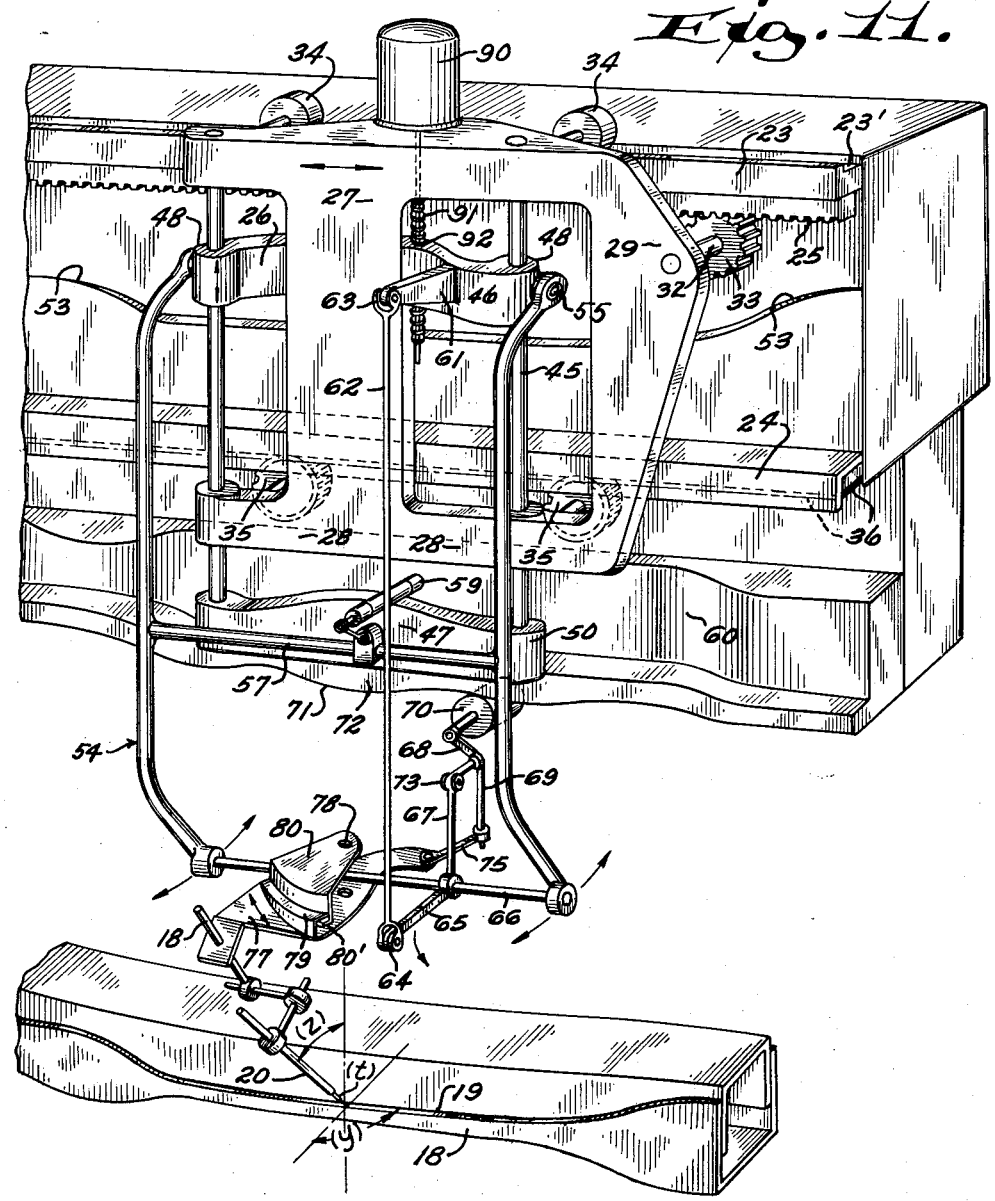
FIG. 11 is a simplified perspective view of the machine showing in diagrammatic form how the angularity of the torch is maintained with respect to the work regardless of changes in the contour of the weld line.

Referring now to FIGS. 2 and 3 and 11, the horizontally movable carriage 26 includes an upper transverse member 27 and a lower portion having laterally projecting legs 28 (see exploded view FIG. 4 and FIG. 11). The carriage also includes a wing portion 29 projecting from one side on which is supported an electric driving motor 30 and a gear box 31. The gear box has an inwardly projecting driven shaft 32 driving a pinion 33 (see FIGS. 11 and 3) which runs on the underside of the rack 25. In addition, the carriage 26 is provided with top wheels 34 which ride in the groove 23' of the upper guiding rail 23, and with lower wheels 35 which ride in a bottom groove 36 of the lower guiding rail 24. It is thus apparent that when the electric motor 30 is in operation, then through the gear box 31 it will drive the pinion 33 in a selected direction to cause the carriage frame 26 to move horizontally along the top horizontal frame member 22 of the main supporting frame. Suitably supported on top of the carriage 26 is a standard 37 (FIG. 1), supporting a reel 38 for the welding wire 39, there being a suitable motor 40 having wire feed mechanism 41 associated therewith whereby the wire 39 may be fed from the reel to the torch 20.

Vertically Movable Frame

Slidably mounted in the ends of the top piece 27 and in the ends of the lower arms 28 in openings 42 and 43 (see FIGS. 4 and 11) are side rods 45 of a vertically movable frame which includes an upper transverse member 46 and a lower transverse member 47. The member 46 has side bushings 48 for receiving the rods and there are set screws 49 for tightening the member 46 to the rods 45 to move therewith. The lower member 47 also has laterally spaced bushings 50 for receiving the rods, there being set screws 51 to tighten the member 47 on the rods for movement therewith. As a result of this arrangement the vertically movable frame, comprising the members 46 and 47, and the rods 45, is mounted on the carriage 26 for vertical movement relative to the carriage. Projecting from the rear of the vertically movable member 46 is a cam follower 52 which is ridable on top of a control cam 53 as shown in FIG. 3. Thus, as the horizontal carriage 26 moves horizontally, the vertically movable frame 46—47 will move in a vertical direction under the influence of the cam 53 depending upon the contour of the top surface thereof.

The Swingable Torch Supporting Frame

An outwardly swingable torch supporting frame 54 (see FIGS. 4, 3 and 11) comprises spaced arms whose upper ends are pivoted as at 55 to laterally projecting pivot members 56 on the vertically movable frame member 46. Projecting inwardly from a center transverse portion 57 of the tiltable frame is a support 58 for a ball cam 59. The frame 54 swings against the tension of a spring 59' (see FIG. 3) on a rod which projects from the vertically movable frame. The cam 59 rides on a cam surface 60 which is contoured in an in and out direction as shown in FIG. 11 to cause in and out swinging movement of the swinging frame 54 in accordance with the contour of the outer face of the cam 60.

Projecting forwardly outwardly from the upper part 46 of the vertically movable frame is an arm 61 to which the upper end of a link 62 is pivoted as at 63. The lower end of the link 62 is pivoted as at 64 to an arm 65 constituting one leg of a bell-crank which is pivoted as at 66 (FIG. 3) to the lower end of the swinging frame 54. The other portion of the bell-crank is forked and projects upwardly as at 67 where it is pivoted to one end of the bent head 68 of a lever 69. The other end of the head 68 carries a cam follower 70 which follows the under surface 71 of a cam member 72. When the contour of the cam portion 71 causes a downward push on the follower 70, it will rock on the pivot 73 against the tension of a spring 74 (see FIG. 7) to pull on a link 75 which is connected to the lower end of the lever 69 and thus cause a pull on the arm 76 of a torch holding bell-crank segment 77 to cause the latter to pivot on the pivot 78 to thereby move the torch 20 in a compensating manner to maintain the angle (Y) of the torch 20 (FIG. 11) so as to always maintain said angle at 90° with the work constant regardless of changes in the contour of the weld line 19 on the work 18. The bell-crank segment 77 is pivotally supported at 78 in its horizontal compensating movement on an arm 80 which is integral with the bell-crank 65—67 (FIG. 4) to tip therewith, and there is an arcuate tongue 79 movable in a groove 80' of the arm 80 (see FIG. 3) to trace the torch holder and guide it in pivotal movement.

Operation of Compensating Mechanism

Whenever the tiltable frame 54 swings outwardly at its lower end due to the action of the cam surface 60 on the follower 59, the linkage 62, 65, 67 and 80 will cause an automatic compensating tilting of the torch support 77 so that the angle (Z) FIGS. 3 and 11, will always remain correct and the same with respect to the work regardless of changes in contour of the weld line. Thus the linkage 62, 65, 67 and 80 causes compensating changes in the torch in one plane and the cam 71 and follower 70 links 69, 75, 76 and member 77 cause compensating changes in the torch in a plane at right angles to the first plane. Due to these compensating mechanisms, the angles (Y) and (Z) of FIG. 11 of the torch are always the same with respect to the work 18 regardless of changes in the contour of the weld line 19 on the work. It is to be noted that the tip ($t$) of the torch is always maintained directly on the axis ($b$) of the pivot 78 for the torch supporting bell-crank 77; and the torch is maintained at the 90° angle (Y) of FIG. 11 by the cam 70 and the link connections 69 and 75 to the bell-crank 77. The parallelogram action of the bar 62 connected to the bell-crank 65 maintains the correct angle (Z) FIG. 11 regardless of swinging of the frame 54. The bell-crank 77 and its support 80 always tip together to maintain (Z).

For holding the torch, there is a rod 81 adjustably secured near its upper end in a split clamping block 82, there being a split block 83 carried by the lower end of the rod 81. Adjustably secured in the split block 83 at the lower end of the rod 81 is a transverse rod 84 carrying a split block 85 at its outer end. Another rod 86 is adjustably secured in the block 84 and it carries a split block 87 at its outer end in which the torch 21 is adjustably clamped. By adjusting the position of the rods 81, 84 and 86 in the clamping blocks 82, 83 and 85, the tip of the welding torch may be adjusted to maintain predetermined angles with the work, as shown in FIG. 11. Once these angles are worked out in the initial set-up of the machine, they will be maintained with respect to the work regardless of changes in contour of the weld line 19. This is due to the novel compensating mechanisms heretofore described.

General Operation

To start the machine, one of the start buttons 88 is depressed, the center button 88' being an emergency stop button. At the start of the operation the carriage is at the right-hand end of the guide-way 23. Upon pressing of the start button 88, operation of the work-holding ram 16 is initiated with the result that the ram elevates the work into engagement with the top clamp 89 so that the work is held firmly in position. As soon as the ram gets to its top position, the electric motor 30 is automatically started with the result that the carriage starts moving horizontally to the left, referring to FIG. 1. As soon as the horizontally moving carriage brings the torch 21 to welding position with respect to the work 18, then the welding circuit is initiated, usually automatically, and this starts the welding, the wire-driving motor 40, being also started to cause feeding of welding wire from the reel 38 to the torch.

As the carriage moves toward the left, the cam follower 52 starts riding down the cam contour 53 to cause vertical adjustment of the torch as required for the contour of the weld line on the work, the swinging frame 54 moving vertically with the vertically movable frame portion 46 under the control of the cam surface 53.

At the same time the cam follower 59 of FIG. 3 is being moved in and out by the outwardly facing cam surface 60 to cause a swinging in or out of the swinging frame 54, the lower end of which supports the torch. As this frame swings in or out in conformity to the contour on the cam face 60 there would normally be a change in the angle (Z), FIGS. 3 and 11, which the torch makes with respect to the work. However, whenever the frame 54 swings, the pivot point 64 is moved and there is a slight rocking movement of the members 65, 67 and 80 to cause a change in the position of the pivot 73 with respect to the swinging frame 54 which in turn results in a rocking of the bell-crank 77 so that it is supported in a manner to just compensate for the tilting of the frame 54. In other words, this linkage results in maintaining the same angle (Z) with respect to the work regardless of the pivoting movement of the frame 54, which movement would normally change such angle.

At the same time the cam follower 70 on the downwardly facing cam 71 creates a pivoting action of the bent head 68 on the lever 69 around the pivot point 73. Referring to FIG. 11, this will cause a pull on the link 75 and such a pull results in a swinging of the bell-crank 77 in the direction indicated by the arrow in FIG. 8. The cam surface 71 is so worked out as to cause the angle (Y) of the torch (FIG. 11) to remain constant with respect to the work (90°) regardless of changes in the contour of the weld line 19 in a direction which would normally affect this angular relationship. It is thus apparent that the novel compensating mechanism is capable of maintaining the torch angle the same in two planes at right angles to one another with respect to the work regardless of changes in the weld line on the work. After each stroke in one direction of the horizontal carriage there is an automatic return in the opposite direction.

As a modification it may be desirable, in lieu of the cam 53 which controls the vertical position of the torch supporting frame 46—47, to have a reversible electric motor 90 (FIGS. 4 and 11) driving a screw 91. The screw connects with an internally threaded nut 92 on the vertically movable frame piece 46 to cause movement of the frame 46—47 up and down as required by the weld line on the work. The electric motor 90 may be driven by a probing device on the work which starts and stops the motor and causes it to run in a selected direction to control the vertical position of the frame 46—47. When such motor is used the cam 53 will either be omitted or the frame will be adjusted so that the follower 52 is above and unaffected by the cam 53. If, however, the cam 52 is to do the vertical controlling, then the screw connection 91 with the member 46 must be removed.

Various changes and modifications may be made without department from the spirit of the invention and all of such changes are contemplated as may come within the scope of the claims.

What we claim is:

1. In an arc welder having a main frame with a horizontally movably supported carriage, a frame vertically movably supported on said carriage, a torch carrying element supported by said vertically movable frame and movable in a transverse plane with respect to the plane of movement of said carriage and frame members, a welding torch angularly adjustably carried by said torch carrying element, means for causing predetermined vertical movements of said vertically movable frame as it is being moved horizontally and in accordance with requirements of the weld line on the work, means associated with said torch carrying element for causing predetermined movement of the latter in a transverse plane with respect to the plane of said movable carriage and frame members in accordance with requirements of the weld line on the work, and means responsive to movements of said movable members automatically adjusting the angular position of the torch in a plurality of planes relative thereto to compensate for movements of the movable members in more than one plane and thereby maintain constant torch angles in a plurality of planes with respect to the work regardless of changes in the contour of the weld line on the work.

2. In an automatic arc welder having a main frame with a horizontally movably supported carriage, a vertically movable frame supported on said carriage for vertical movement, a swingable torch carrying frame pivotally suspended from said vertically movable frame for in and out swinging movement with respect thereto, a welding torch angularly adjustably carried by said torch supporting frame, automatic means for causing predetermined vertical movements of said vertically movable frame as it is being moved horizontally and in accordance with requirements of the weld line on the work, means for automatically causing predetermined in and out swinging movement of said swinging frame in accordance with requirements of the weld line on the work, and means responsive to movement of said swingable frame for automatically adjusting the angular position of the torch relative thereto to maintain a constant torch angle with respect to the work regardless of the in and out movement of said swingable frame.

3. In an automatic arc welder having a main frame with a horizontally movably supported carriage, a vertically movable frame supported on said carriage for vertical movement, a swingable torch carrying frame pivotally suspended from said vertically movable frame for in and out swinging movement with respect thereto, a torch supporting mechanism pivotally supported by a lower portion of said swingable frame, a welding torch carried by said torch supporting mechanism so as to be disposed at a predetermined angle with respect to the work, automatic means for causing predetermined vertical movements of said vertically movable frame as it is being moved horizontally and in accordance with requirements of the weld line on the work, means including co-operating devices on the main frame and swingable frame for automatically causing predetermined in and out swinging movement of said swinging frame in accordance with requirements of the weld line on the work, and means responsive to said swinging movement of said swingable frame for pivotally moving the torch supporting mechanism relative to the swingable frame to compensate for swinging movement of the latter and thereby maintain a constant torch angle with respect to the weld line on the work.

4. In an automatic arc welder having a main frame with a horizontally movably supported carriage, a vertically movable frame supported on said carriage for vertical movement, a swingable torch carrying frame pivotally suspended from said vertically movable frame for in and out swinging movement with respect thereto, torch supporting mechanism pivotally supported by a lower portion of said swingable frame, a welding torch carried at a predetermined angle by said torch supporting mechanism, automatic means for causing predetermined vertical movements of said vertically movable frame as it is being moved horizontally and in accordance with requirements of the weld line on the work, means including co-operating devices on the main frame and swingable frame for automatically causing predetermined in and out swinging movement of said swinging frame in accordance with requirements of the weld line on the work, and means responsive to movements of said movable members with respect to the work for pivotally moving the torch supporting mechanism relative thereto to compensate for movements thereof in more than one plane and thereby maintain constant torch angles in a plurality of planes with respect to the work regardless of changes in the contour of the weld line on the work.

5. In an automatic arc welder having a main frame with a horizontally movably supported carriage, a vertically movable frame supported on said carriage for vertical movement, a swingable torch carrying frame pivotally suspended from said vertically movable frame for in and out swinging movement with respect thereto, torch supporting mechanism pivotally supported by a lower portion of said swingable frame, a welding torch carried at predetermined angles by said torch supporting mechanism, automatic means for causing predetermined vertical movements of said vertically movable frame as it is being moved horizontally and in accordance with requirements of the weld line on the work, means including co-operating devices on the main frame and swingable frame for automatically causing predetermined in and out swinging movement of said swinging frame in accordance with requirements of the weld line on the work, means responsive to said swinging movement of said swingable frame for pivotally moving the torch supporting mechanism in one plane relative to the swingable frame to compensate for swinging movement of the latter and thereby maintain a constant torch angle with respect to the weld line on the work, and means responsive to movement of the movable carriage and frame members with respect to the work for pivotally moving the torch supporting mechanism in another plane to thereby maintain constant torch angles in a plurality of planes which are constant with respect to the work regardless of changes in contour of the weld line on the work.

6. In an automatic arc welder having a main frame with a horizontally movably supported carriage, a vertically movable frame supported on said carriage for vertical movement, a swingable torch carrying frame pivotally suspended from said vertically movable frame for in and out swinging movement with respect thereto, a torch supporting mechanism pivotally supported by a lower portion of said swingable frame, a welding torch carried at predetermined angles by said torch supporting mechanism, automatic means for causing predetermined vertical movements of said vertically movable frame as it is being moved horizontally and in accordance with requirements of the weld line on the work, means including co-operating devices on the main frame and swingable frame for automatically causing predetermined in and out swinging movement of said swinging frame in accordance with requirements of the weld line on the work, means responsive to said swinging movement of said swingable frame for pivotally moving the torch supporting mechanism in one plane relative to said swingable frame to compensate for swinging movement of the latter and thereby maintain a constant torch angle with respect to the weld line on the work, and means responsive to movement of said movable carriage and frame members with respect to the work for pivotally moving the torch supporting mechanism in a plane at right angles to said first plane to thereby maintain a constant torch angle in said last plane and thereby maintain said second torch angle constant with respect to the work regardless of changes in contour of the weld line on the work.

7. In an automatic arc welder having a main frame with a horizontally movably supported carriage, the combination comprising: a vertically movable frame supported on said carriage for vertical movement; a swingable torch carrying frame pivotally suspended from said vertically movable frame for in and out swinging movement with respect thereto; automatic means for causing predetermined vertical movement of said vertically movable frame as the latter is being moved horizontally with said carriage in accordance with requirements of the weld line on the work; means for causing predetermined in and out movement of said swingable frame in accordance with the weld line on the work; a link pivotally attached to and depending from said vertically movable frame; a bell crank pivotally carried by said swingable frame adjacent the lower end of said link; a welding torch carried by said bell crank; linkage means connecting said bell crank and the lower end of said link whereby said bell crank will be tilted in a predetermined manner in response to movement of the swingable frame so that said welding torch will be maintained at a constant angle relative to the work regardless of the in and out movement of said swingable frame.

8. In an automatic arc welder having a main frame with a horizontally movably supported carriage, the combination comprising: a vertically movable frame supported on said carriage for vertical movement; a swingable torch carrying frame pivotally suspended from said vertically movable frame for in and out swinging movement with respect thereto; automatic means for causing predetermined vertical movement of said vertically movable frame as the latter is being moved horizontally with said carriage in accordance with requirements of the weld line on the work; means for causing predetermined in and out movement of said swingable frame in accordance with the weld line on the work; a bell crank pivotally carried by said swingable frame; a welding torch carried by said bell crank; a cam surface on said main frame; a cam follower positioned to ride on said cam surface; means connecting said cam follower to said bell crank so that the latter will be pivoted in a predetermined manner in response to movement of the cam follower on said cam surface and whereby the welding torch carried by said bell crank will be maintained at a constant angle relative to the work regardless of the contour of the weld line on the work.

9. In an automatic arc welder having a main frame with a horizontally movably supported carriage, the combination comprising: a vertically movable frame supported on said carriage for vertical movement; a swingable torch carrying frame pivotally suspended from said vertically movable frame for in and out swinging movement with respect thereto; automatic means for causing predetermined vertical movement of said vertically movable frame as the latter is being moved horizontally with said carriage in accordance with requirements of the weld line on the work; means for causing predetermined in and out movement of said swingable frame in accordance with the weld line on the work; a link pivotally attached to and depending from said vertically movable frame; a bell crank pivotally carried by said swingable frame adjacent the lower end of said link; a welding torch carried by said bell crank; linkage means connecting said bell crank and the lower end of said link whereby said bell crank will be tilted in one plane in a predetermined manner in response to movement of the swingable frame so that said welding torch will be maintained at a constant angle in said plane relative to the work regardless of the in and out movement of said swingable frame, and said bell crank also being pivotal in a second plane; a cam surface on said main frame; a cam follower positioned to ride on said cam surface; means connecting said cam follower to said bell crank so that the latter will be pivoted in said second plane in a predetermined manner in response to movement of the cam follower on said cam surface and whereby the welding torch carried by said bell crank will be maintained at a constant angle in said second plane relative to the work regardless of the contour of the weld line on the work.

10. In an automatic arc welder having a main frame with a horizontally movably supported carriage, the combination comprising: a vertically movable frame supported on said carriage for vertical movement; a swingable torch carrying frame pivotally suspended from said vertically movable frame for in and out swinging movement with respect thereto; a removable cam surface carried by said main frame, said cam surface being disposed in a horizontal plane; a cam follower on said vertically movable frame positioned to ride on said horizontal cam surface and to cause predetermined vertical movement of said frame as the latter is being moved horizontally with said carriage in accordance with requirements of the weld line on the work; a vertically disposed cam surface removably carried by said main frame; a cam follower mounted on said swingable frame and positioned to ride on said vertical cam surface to cause predetermined in and out movement of said swingable frame in accordance with the weld line on the work; a link pivotally attached to and depending from said vertically movable frame; a bell crank pivotally carried by said swingable frame adjacent the lower end of said link; a welding torch carried by said bell crank; linkage means connecting said bell crank and the lower end of said link whereby said bell crank will be tilted in a vertical plane in a predetermined manner in response to movement of the swingable frame so that said welding torch will be maintained at a constant vertical angle relative to the work regardless of the in and out movement of said swingable frame, and said bell crank also being pivotal in a horizontal plane; a second horizontal cam surface on the lower portion of said main frame; a cam follower positioned to ride on said second horizontal cam surface; means connecting said second horizontal cam follower to said bell crank whereby the latter will be pivoted in a horizontal plane in a predetermined manner in response to movement of said second horizontal cam follower so that the welding torch carried by said bell crank will be maintained at a constant horizontal angle relative to the work regardless of the counter of the weld line on the work.

References Cited in the file of this patent

UNITED STATES PATENTS

| | | |
|---|---|---|
| 2,288,032 | Smith | June 30, 1942 |
| 2,827,548 | Griswold | Mar. 18, 1958 |
| 2,927,992 | Bateman | Mar. 6, 1960 |